(No Model.)
W. V. TUFFORD.
ATTACHMENT FOR PRINTING CASE STANDS.
No. 344,927. Patented July 6, 1886.
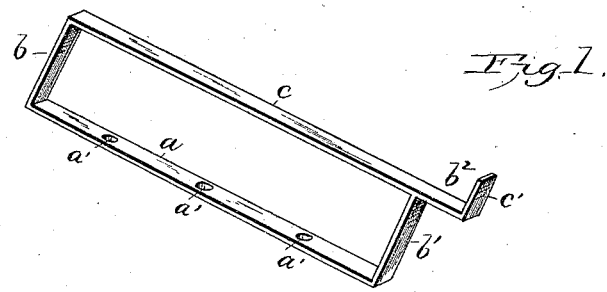
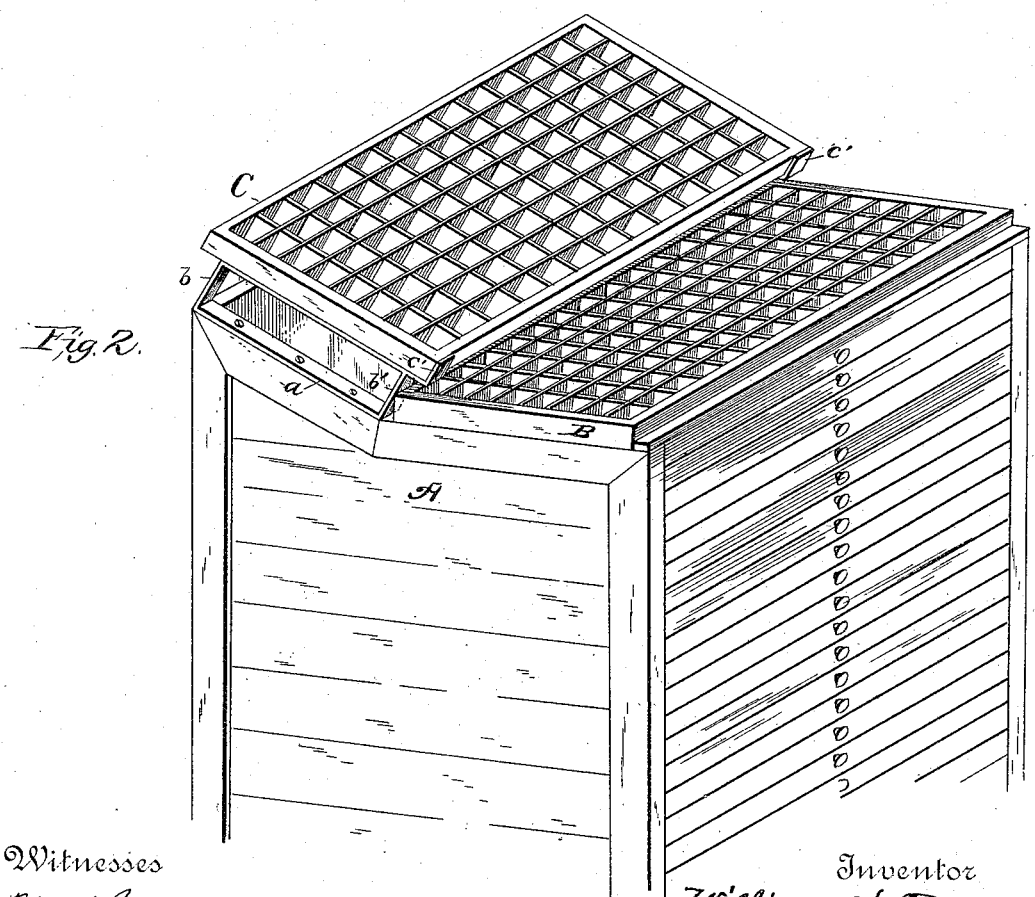
Witnesses
Wm. J. Rosenbaum
H. A. Daniels
Inventor
William V. Tufford
By his Attorney W. V. Burris
N. PETERS, Photo-Lithographer, Washington, D. C.

UNITED STATES PATENT OFFICE.

WILLIAM V. TUFFORD, OF CLINTON, IOWA, ASSIGNOR TO MARDER, LUSE & CO., OF CHICAGO, ILLINOIS.

ATTACHMENT FOR PRINTING-CASE STANDS.

SPECIFICATION forming part of Letters Patent No. 344,927, dated July 6, 1886.

Application filed January 19, 1886. Serial No. 190,191. (No model.)

*To all whom it may concern:*

Be it known that I, WILLIAM V. TUFFORD, a citizen of the United States of America, residing at Clinton, in the county of Clinton and State of Iowa, have invented certain new and useful Improvements in Attachments for Printing-Case Stands, of which the following is a specification, reference being had therein to the accompanying drawings.

My invention consists of a device adapted to be attached to a printer's stand, and constructed to hold the upper type-case in a position nearer to the compositor than the position of the upper-case on the ordinary printer's stand, as hereinafter fully set forth and claimed.

In the drawings, Figure 1 is a perspective of my new type-case projector. Fig. 2 is a perspective illustrating the application of the projector to a printer's stand with the upper and lower type-cases in their relative positions.

The projector may be constructed of any suitable material and in any desirable form which may be adapted for the purpose, the principle of the invention not depending upon the particular construction herein set forth, which consists of an iron frame having a flat straight base-plate, $a$, supporting ends $b\ b'$, and top plate, $c$. The base-plate is provided with holes $a'$, to receive the screws which fasten the projector to the stand A, as shown in the drawings. The top plate is constructed with an extension, $b^2$, which terminates in an upwardly-inclined end, $c'$. The ends $b\ b'$ may be made any required length, so as to raise the upper-case C to any height desired.

The body of the projector is constructed to extend from the back of the lower-case B to the back of the stand. The extension $b^2$ of the projector extends beyond the end $b'$ and over the back of the lower-case far enough to place the front edge of the upper-case, when properly adjusted, on the projectors in line with the back ends of the rear compartments of the lower-case. One of these projectors is attached at each end on the back portion of the stand, and the upper-case is placed on the projectors, with its front edge resting against the upwardly-inclined ends $c'$, which hold the case in position on the projectors, as shown in Fig. 2 of the drawings, and thus the upper-case is placed nearer to the compositor than a case placed on the ordinary printer's stand, and hence the distance traveled by the hand and the time and labor required in setting and distributing the type are correspondingly lessened.

What I claim as new is—

1. The combination, with a printing case stand, A, and the upper type-case, C, of a type-case projector adapted to be attached to the stand and to support the upper-case in the projected position, substantially as and for the purposes described.

2. The type-case projector consisting of a frame having a base-plate, $a$, adapted to be attached to a printer's stand, supporting ends $b\ b'$, and top plate, $c$, having the extension $b^2$ and the upwardly-inclined end $c'$, in combination with a printer's stand, A, and upper and lower cases, B C, substantially as and for the purposes described.

In testimony whereof I affix my signature in presence of two witnesses.

WILLIAM V. TUFFORD.

Witnesses:
 LE ROY BRADLEY,
 CASSIUS M. BURLINGAME.